(12) United States Patent
Shah et al.

(10) Patent No.: US 6,416,125 B1
(45) Date of Patent: Jul. 9, 2002

(54) VEHICLE SEAT CONNECTION ASSEMBLY

(75) Inventors: Suresh D. Shah, Troy; Mladen Humer, Eastpointe, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/577,940

(22) Filed: May 23, 2000

(51) Int. Cl.$^7$ ................................................. B60N 2/42
(52) U.S. Cl. ............... 297/216.12; 297/408; 297/463.1; 297/463.2; 403/164
(58) Field of Search ................................. 297/408, 391, 297/216.12, 216.13, 463.1, 463.2; 403/164, 165; 16/225, DIG. 13

(56) References Cited

U.S. PATENT DOCUMENTS

| | | |
|---|---|---|
| 4,685,737 A | 8/1987 | Deley et al. |
| 4,900,060 A * | 2/1990 | Yamamoto et al. ......... 297/469 |
| 5,145,233 A | 9/1992 | Nagashima |
| 5,378,043 A | 1/1995 | Viano et al. |
| 5,669,667 A * | 9/1997 | Schmidt .................. 297/408 X |
| 5,711,579 A | 1/1998 | Albrecht |
| 5,733,009 A | 3/1998 | De Filippo |
| 5,795,019 A | 8/1998 | Wieclawski |
| 5,836,648 A | 11/1998 | Karschin et al. |
| 5,927,804 A | 7/1999 | Cuevas |
| 6,019,424 A | 2/2000 | Rückert et al. |
| 6,024,406 A | 2/2000 | Charras et al. |
| 6,199,947 B1 * | 3/2001 | Wilklund ............... 297/216.12 |

* cited by examiner

Primary Examiner—Anthony D. Barfield
(74) Attorney, Agent, or Firm—Brooks & Kushman P.C.

(57) ABSTRACT

A vehicle seat connection (18) has particular utility for mounting a headrest support assembly (14) on a seat back frame (12). The connection assembly (18) includes first and second plastic seat components embodied by first and second connectors (50, 52) that are injection molded in situ over enlarged flanges (56, 58) of first and second ends (44, 46) of a connector link (42) which has an intermediate portion (48) extending between its ends. The connector link is movable with respect to both the first and second connectors (52, 52) to move the headrest upwardly and forwardly upon rearward movement of a vehicle seat occupant.

16 Claims, 2 Drawing Sheets

VEHICLE SEAT CONNECTION ASSEMBLY

TECHNICAL FIELD

This invention relates to a vehicle seat connection assembly and also relates to a vehicle seat back including a pair of the connection assemblies for mounting a headrest support assembly on a seat back frame.

BACKGROUND ART

Vehicle seats include different types of structural members that are connected to each other by connection assemblies in order to permit movement between the structural members during vehicle seat use. For example, vehicle seat backs have previously included headrests that are mounted by associated support assemblies on the seat back frames for combined vertical and back-to-back front movement. Connection assemblies at opposite lateral sides of the seat assembly extend between the lateral sides of the seat back frame and the headrest support assembly to control the movement of the headrest on the frame such that rearward movement of the support assembly under the impetus of a vehicle occupant moving to the rear during an impact will cause the headrest to move upwardly and forwardly to engage the occupant's head.

Vehicle headrest assemblies noted by an investigation conducted in connection with the present invention are disclosed by United States Patents: U.S. Pat. No. 4,685,737 Deley et al.; U.S. Pat. No. 5,145,233 Nagashima; U.S. Pat. No. 5,378,043 Viano et al.; U.S. Pat. No. 5,711,579 Albrecht; U.S. Pat. No. 5,733,009 De Filippo; U.S. Pat. No. 5,795,019 Wieclawski; U.S. Pat. No. 5,836,648 Karschin et al.; U.S. Pat. No. 5,927,804 Cuevas; U.S. Pat. No. 6,019,424 Ruckert et al.; and U.S. Pat. No. 6,024,406 Charras et al.

Also, toy animals, which are not related to the vehicle seat connection assembly of the present application, have previously included an animal arm that is molded in situ to the animal's shoulder to provide a movable shoulder joint.

DISCLOSURE OF INVENTION

An object of the present invention is to provide an improved vehicle seat connection assembly.

In carrying out the above object, the vehicle seat connection assembly of the invention includes a connector link having first and second portions and a connecting portion extending between its first and second portions. The first and second portions of the connector link each have an enlarged flange. A first plastic seat component of the connection assembly is injection molded in situ over the enlarged flange of the first portion of the connector link to provide a movable joint with the connector link. A second plastic seat component of the connection assembly is injection molded in situ over the enlarged flange of the second portion of the connector link to provide a movable joint with the connector link. The connector link is movable with respect to both the first and second plastic components and cooperates therewith to provide the connection assembly.

In one construction of the connection assembly, the first and second plastic seat components are connectors that connect to other associated seat components. These plastic seat connectors are disclosed as being lateral connectors and tube end connectors.

In another construction, the first and second plastic seat components of the connection assembly are structural seat components that are directly connected by the connector link.

In the preferred embodiments of the vehicle seat connection assembly, the first and second portions of the connector link are embodied by link ends which define the enlarged flanges over which the associated plastic seat components are injection molded in situ.

In one embodiment, the connector link of the vehicle seat connection assembly is made from a metallic rod having first and second ends that embody the first and second portions. The connector link has an intermediate portion that embodies its connecting portion and that extends between its first and second ends, and the first and second ends of the connector link have enlarged flanges over which the associated plastic seat components are molded in situ. The connector link of this embodiment also has its intermediate portion injection molded over the metallic rod and providing an attachment location that can be utilized for a resilient bias.

In another embodiment, the connector link of the vehicle seat connection seat assembly is injection molded entirely from plastic with its first and second portions each having an enlarged flange over which the associated plastic seat component is injection molded in situ. This embodiment also has the connecting portion of the connector link injection molded from plastic with an attachment location for an associated resilient bias.

Another object of the present invention is to provide an improved vehicle seat back.

In carrying out the immediately preceding object, a vehicle seat back constructed in accordance with the present invention includes a frame having a pair of spaced side portions and an upper portion extending between the side portions to define an inverted U shape. A headrest support assembly of the seat back has an upper portion for supporting a headrest and is mounted by the upper portion of the frame for combined vertical and back-to-back front movement with respect to the seat back. The headrest support assembly has a lower portion located below the upper portion of the frame between the pair of spaced side portions. A pair of connection assemblies of the seat back respectively mount the lower portion of the headrest support assembly on the pair of spaced side portions of the frame. Each connection assembly includes a connector link having first and second ends and an intermediate portion extending between the ends. A first plastic connector of each connection assembly is injection molded in situ over the first link end of the connector link to provide a movable joint therewith, and the first plastic connector is mounted on one of the spaced side portions of the frame. A second plastic connector of each connection assembly is injection molded in situ over the second link end to provide a movable joint therewith, and the second plastic connector is mounted on the lower portion of the headrest support assembly. The connector links of the pair of connection assemblies are movable with respect to their associated first and second plastic connectors and cooperate therewith to support the headrest assembly on the frame.

In the preferred construction of the vehicle seat back, the first plastic connectors of the pair of connection assemblies have vertically extending mounting surfaces for respectively mounting on the spaced side portions of the frame. Furthermore, the lower portion of the headrest support assembly includes a pair of tubes having downwardly opening ends, and the second plastic connectors of the pair of connection assemblies are respectively mounted within the downwardly openings ends of the pair of tubes of the lower portion of the headrest support assembly. In addition, the intermediate portion of each connector link has an injection molded attachment location, and a resilient bias extends between the attachment locations of the intermediate portions of the connector links and the frame to bias the headrest support assembly downwardly and rearwardly.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
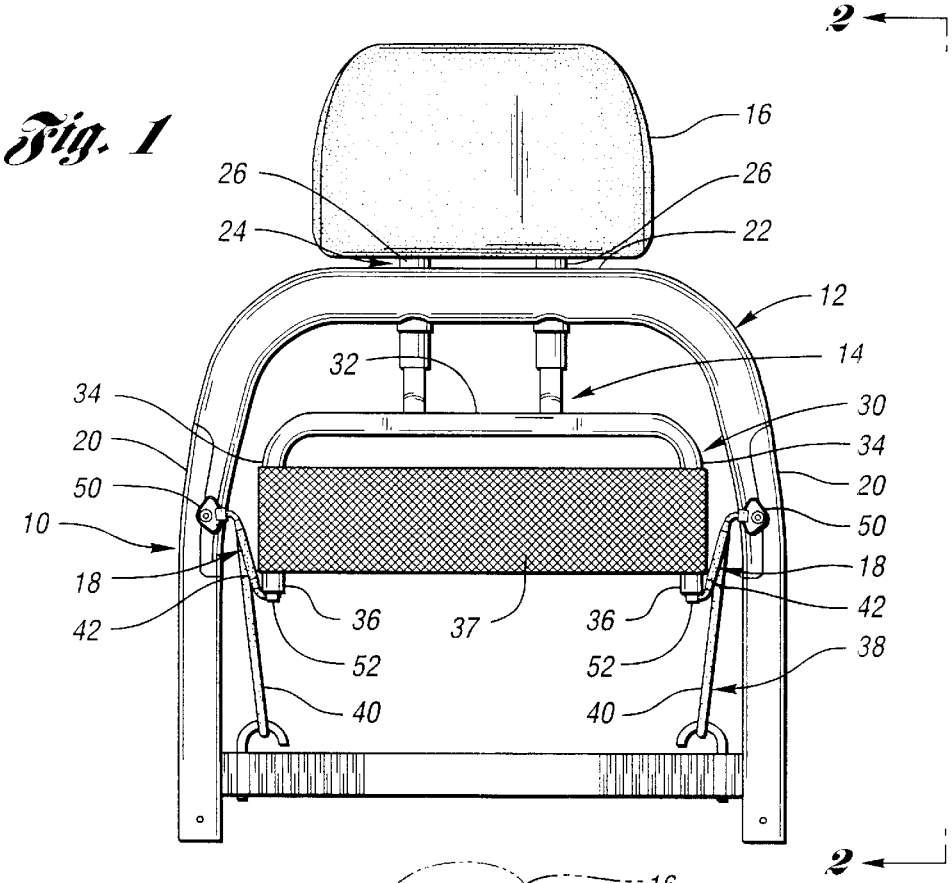
FIG. 1 is an elevational view looking rearwardly at a vehicle seat back that is constructed in accordance with the invention and includes a pair of connection assemblies of the invention.
Figure 2:
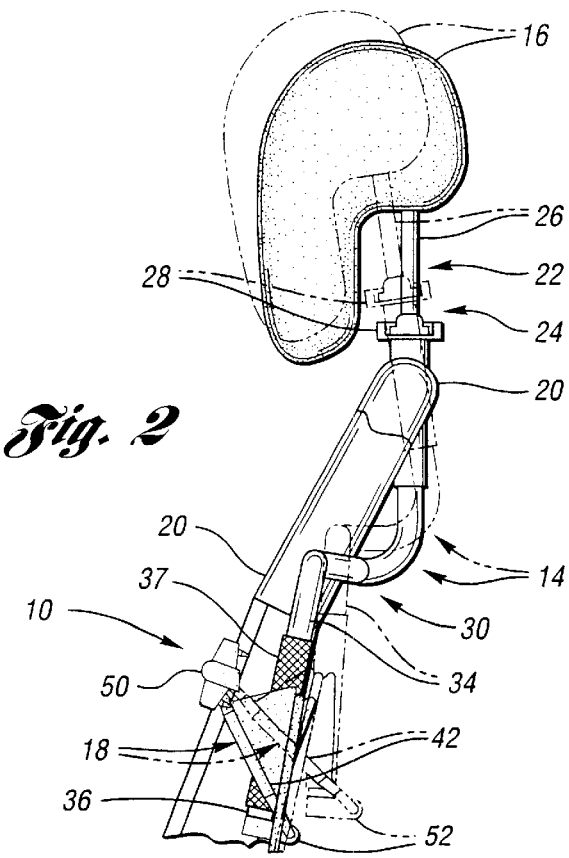
FIG. 2 is a side view of the seat back taken along the direction of line 2—2 in FIG. 1.

With reference to FIGS. 1 and 2 of the drawings, a vehicle seat back constructed in accordance with the invention is generally indicated by 10 and includes a frame 12, a headrest support assembly 14 for supporting a headrest 16, and a pair of connection assemblies 18 that connect the frame 12 and the headrest support assembly 14 in accordance with this invention as is hereinafter more fully described. The connection assemblies 18 are constructed in a manner that has utility in other seating uses wherein structural seating components are interconnected but movable with respect to each other. However, the construction of the connection assemblies 18 has particular utility for use in the connection of the seat back frame and headrest support assembly as specifically disclosed.

With continuing reference to FIG. 1, the frame 12 of the seat back has a pair of spaced side portions 20 and an upper portion 22 extending between the side portions to define an inverted U shape. The headrest support assembly 14 has an upper portion 24 for supporting the headrest 16. More specifically, the upper portion 24 of the headrest support assembly includes a pair of mounting rods 26 that support the headrest 16 and extend through openings in the upper portion 22 of the seat frame so as to be movable vertically and pivotable about a lateral seat axis such that the headrest 16 can be moved between the solid and phantom line indicated positions of FIG. 2. Stops 28 on the mounting rods 26 limit the downward movement of the headrest support assembly 14 by engaging the upper portion 22 of the seat back frame. The headrest support assembly 14 also includes a lower portion 30 that is located below the upper portion 22 of the seat back frame and between its pair of spaced side portions 20 with the mounting rods 26 extending upwardly therefrom through the seat back upper frame portion. More specifically, the lower portion 30 of the headrest support frame has an inverted U shape of a tubular construction including a laterally extending tube portion 32 from which the headrest mounting rods 26 extend upwardly, and the headrest support assembly also includes a pair of laterally spaced side tubes 34 that extend downwardly and have downwardly opening tube ends 36. A cloth web 37 extends between the side tubes 34.

As shown by combined reference to FIGS. 1 and 2, the connection assemblies 18 extend between the side portions 20 of the seat frame and the lower portion 30 of the headrest support assembly to provide support thereof on the frame. A resilient bias 38 provided by a pair of springs 40, which may be metal springs or the elastic cords shown, biases the connection assemblies 18 so as to position the headrest 16 in its solid line indicated position of FIG. 2. Rearward movement of the vehicle seat occupant against the web 37, such as during an impact, forces the lower portion 30 of the headrest support assembly rearwardly and through the connection assemblies 18 also provides upward movement thereof such that the headrest 16 is moved upwardly and forwardly to the phantom line indicated position to support the occupant's head against rearward movement.

Figure 3:
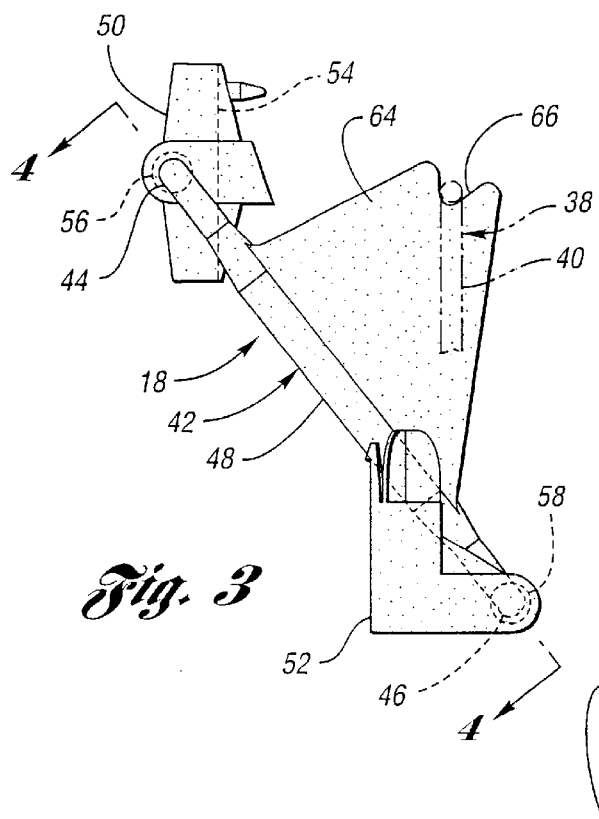
FIG. 3 is an enlarged view of the vehicle seat connection assembly of the invention.
Figure 4:
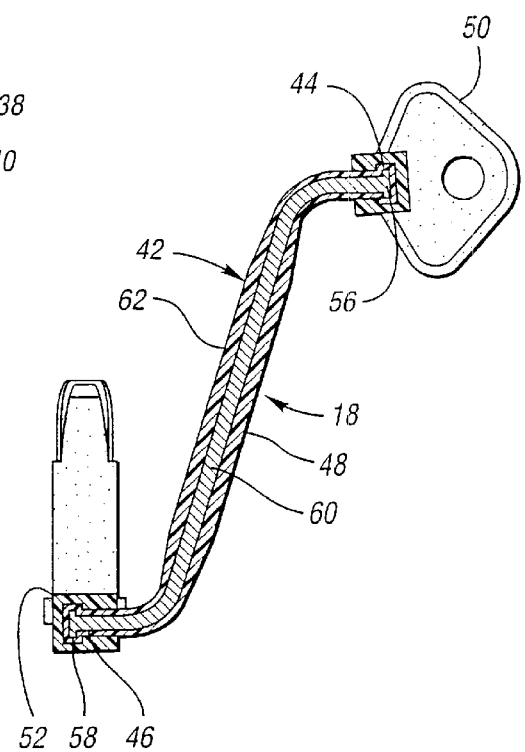
FIG. 4 is a sectional view taken along the direction of line 4—4 in FIG. 3 through the vehicle seat connection assembly.

With reference to FIGS. 3 and 4, each connection assembly 18 includes a connector link 42 having first and second portions embodied by first and second ends 44 and 46. The connector link 42 also has a connecting portion embodied by an intermediate portion 48 extending between the first and second link ends 44 and 46. A first plastic seat component embodied by a first connector 50 is injection molded in situ over the first link end 44 to provide a movable joint with the link at this location. Furthermore, a second plastic seat component embodied by a second connector 52 is injection molded in situ over the second link end to provide a movable joint with the link at this location. Each of the first connectors 50 is a lateral connector including an associated vertical mounting surface 54 that engages the associated seat frame side portion 20 as shown in FIG. 1 with suitable fasteners 54 providing the securement of these connectors to the seat frame. The second connector 52 of each connection assembly is a tube end connector and is received within the downwardly opening tube end 36 of the associated side tube 34 of the lower portion of the headrest support assembly as shown in FIG. 1 to provide the interconnection with the headrest support assembly.

As shown in FIG. 4, the first and second ends 44 and 46 of the connector link 42 have enlarged flanges 56 and 58 that maintain the assembled construction of the in situ molded seating components provided by the first and second connectors 50 and 52 that are injection molded in situ over these flanges.

With continuing reference to FIG. 4, the connector link 42 is illustrated as being made from an elongated metal rod 60 having ends that are formed to provide the enlarged flanges 56 and 58. Furthermore, an outer plastic layer 62 is injection molded over the rod 60 at its end flanges 56 and 58 and at its intermediate portion 48 where the plastic provides a wing 64 as shown in FIG. 3. This intermediate wing 64 of the connection rod includes an attachment location 66 for the associated spring 40 of the resilient bias 38.

Figure 5:
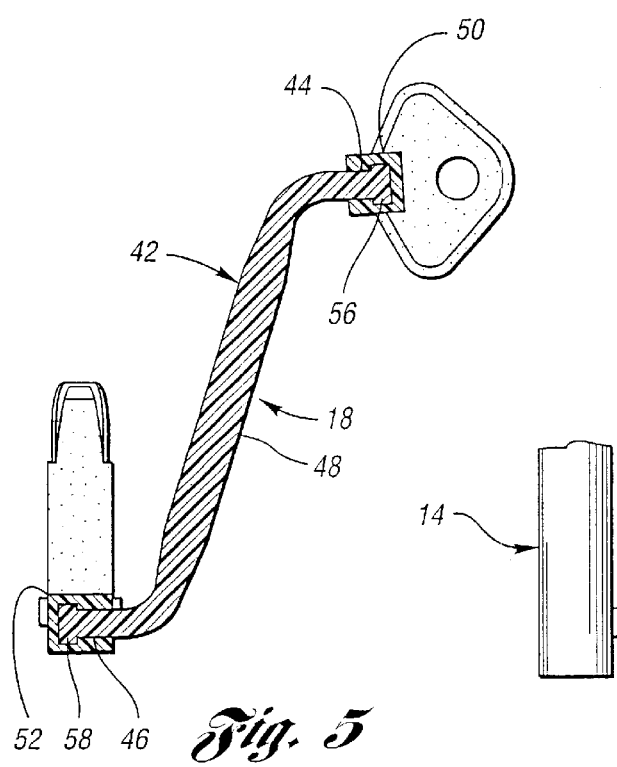
FIG. 5 is a sectional view taken in the same direction as FIG. 4 but illustrating another embodiment of the vehicle seat connection assembly.

With reference to FIG. 5, another embodiment of the connection assembly 18' has the same construction as the previously described embodiment except that the connector link 42' is injection molded entirely from plastic rather than having the plastic injection molded over a metal rod as with the embodiment of FIG. 4. Otherwise, the construction of the connection assembly 18' and its connector link 42' is the same as the previously described embodiment so as to have the enlarged flanges 56 and 58 over which the seating components provided by the connectors 50 and 52 are injection molded and, likewise, having the intermediate portion 48 provided with the wing 64 that provides the attachment location 66 for the spring 40 of the resilient bias.

Figure 6:
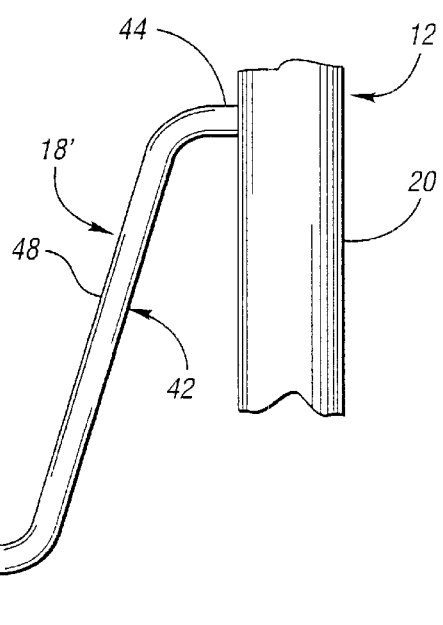
FIG. 6 is a view that illustrates the vehicle seat connection assembly interconnecting structural seating components.

With reference to FIG. 6, another embodiment of the connection assembly 18" is illustrated as having structural seating components 20 and 34 injection molded in situ over the first and second link ends 44 and 46, specifically the associated seat frame side portion 20 and the associated headrest support assembly lower component 34 are injection molded over the link ends. The structural components as opposed to the connectors that attach to the structural components are thus also part of the connection as well as being structural seating components.

With each embodiment, the plastic material utilized to injection mold the seat components in situ over the connector link ends may have a lower melting temperature than the plastic of the link ends so there is no fusion that prevents movement of the joint that is formed at their junctions. After the injection molding of the link ends, mold portions covering the link ends are removed and the link ends are cooled prior to positioning within another mold in which the seat components are injection molded in situ to provide the movable joints. This cooling also prevents fusion and joint lockup.

The manner in which the connection assemblies disclosed have injection molding in situ of seating components over the link reduces the number of parts that need to be inventoried as well as reducing assembling and other costs involved with seat manufacturing.

While the first and second portions of the connector link where the seat components are injection molded in situ to provide the movable joints are disclosed as link ends, it should be appreciated that other types of links could have one or more of these connections provided at an intermediate portion of a link which has ends that are otherwise connected. Likewise, it would be possible to have more than two plastic seat components injection molded in situ over different portions of the connector link to provide other link connections.

While the best mode for carrying out the invention has been described in detail, those skilled in the art to which this invention relates will recognize various alternative designs and embodiments for carrying out the invention as defined by the following claims.

What is claimed is:

1. A vehicle seat connection assembly comprising:
   a connector link having first and second portions and a connecting portion extending therebetween, and the first and second portions each having an enlarged flange;
   a first plastic seat component that is injection molded in situ over the enlarged flange of the first portion of the connector link to provide a movable joint therewith; and
   a second plastic seat component that is injection molded in situ over the enlarged flange of the second portion of the connector link to provide a movable joint therewith, whereby the connector link is movable with respect to both the first and second plastic seat components and cooperates therewith to provide the connection assembly.

2. A vehicle seat connection assembly as in claim 1 wherein the first and second plastic seat components are connectors that connect to other associated seat components.

3. A vehicle seat connection assembly as in claim 2 wherein the first and second plastic seat connectors are selected from the group consisting of lateral connectors and tube end connectors.

4. A vehicle seat connection assembly as in claim 1 wherein the first and second plastic seat components are structural seat components that are directly connected by the connector link.

5. A vehicle seat connection assembly as in claim 1 wherein the connector link has first and second ends that embody the first and second portions of the connector link having the enlarged flanges over which the associated plastic seat component is injection molded in situ.

6. A vehicle seat connection assembly as in claim 1 wherein the connector link is made from a metallic rod having first and second ends that embody the first and second portions thereof, the connector link having an intermediate portion that embodies its connecting portion and that extends between its first and second ends, and the first and second ends of the connector link having enlarged flanges over which the associated plastic seat components are molded in situ.

7. A vehicle seat connection assembly as in claim 6 wherein the connector link includes an intermediate body portion injection molded over the metallic rod and providing the intermediate portion of the connector link with an attachment location.

8. A vehicle seat connection assembly as in claim 1 wherein the connector link is injection molded entirely from plastic with its first and second portions each having an enlarged flange over which the associated plastic seat component is injection molded in situ.

9. A vehicle seat connection assembly as in claim 8 wherein the connecting portion of the connector link is injection molded from plastic with an attachment location.

10. A vehicle seat connection assembly comprising:
    a connector link having first and second ends each of which includes an enlarged flange, and the connector link including an intermediate portion extending between its first and second ends;
    a first plastic seat component that is injection molded in situ over the enlarged flange of the first end of the connector link to provide a movable joint therewith; and
    a second plastic seat component that is injection molded in situ over the enlarged flange of the second end of the connector link to provide a movable joint therewith, whereby the flanged ends of the connector link are movable with respect to the first and second plastic seat components and cooperate therewith to provide the connection assembly.

11. A vehicle seat back comprising:
    a frame having a pair of spaced side portions and an upper portion extending between the side portions to define an inverted U shape;
    a headrest support assembly having an upper portion for supporting a headrest and being mounted by the upper portion of the frame for combined vertical and back-to-front movement with respect to the seat back, and the headrest support assembly having a lower portion located below the upper portion of the frame between the pair of spaced side portions; and
    a pair of connection assemblies for respectively mounting the lower portion of the headrest support assembly on the pair of spaced side portions of the frame, and each connection assembly including:

a connector link having first and second ends and an intermediate portion extending therebetween;

a first plastic connector that is injection molded in situ over the first link end of the connector link to provide a movable joint therewith, and the first plastic connector being mounted on one of the spaced side portions of the frame; and a second plastic connector that is injection molded in situ over the second link end to provide a movable joint therewith, and the second plastic connector being mounted on lower portion of the headrest support assembly, whereby the connector link is movable with respect to both the first and second plastic connectors and cooperates therewith to support the headrest support assembly on the frame.

12. A vehicle seat back as in claim 11 wherein the first plastic connectors of the pair of connection assemblies have vertically extending mounting surfaces for respectively mounting on the spaced side portions of the frame.

13. A vehicle seat back as in claim 11 wherein the lower portion of the headrest support assembly includes a pair of tubes having downwardly opening ends, and the second plastic connectors of the pair of connection assemblies being respectively mounted within the downwardly opening ends of the pair of tubes of lower portion of the headrest support assembly.

14. A vehicle seat back as in claim 11 wherein the first plastic connectors of the pair of connection assemblies having vertically extending mounting surfaces for respectively mounting on the spaced side portions of the frame, the lower portion of the headrest support assembly including a pair of tubes having downwardly opening ends, and the second plastic connectors of the pair of connection assemblies being respectively mounted within the downwardly opening ends of the pair of tubes of lower portion of the headrest support assembly.

15. A vehicle seat back as in claim 11 wherein the intermediate portion of each connector link has an injection molded attachment location, and further including a resilient bias that extends between the attachment locations of the intermediate portions of the connector links and the frame to bias the headrest support assembly downwardly and rearwardly.

16. A vehicle seat back comprising:

a frame having a pair of spaced side portions and an upper portion extending between the side portions to define an inverted U shape;

a headrest support assembly having an upper portion for supporting a headrest and being mounted by the upper portion of the frame for combined vertical and back-to-front movement with respect to the seat back, and the headrest support assembly having a lower portion located below the upper portion of the frame between the pair of spaced side portions and including a pair of tubes having downwardly opening ends;

a pair of connection assemblies for respectively mounting the lower portion of the headrest support assembly on the pair of spaced side portions of the frame, and each connection assembly including:

a connector link having first and second ends and an intermediate portion extending therebetween, and the intermediate portion of each connector link having an attachment location;

a first plastic connector that is injection molded in situ over the first link end of the connector link to provide a movable joint therewith, and the first plastic connector having a vertically extending mounting surface mounted on an associated one of the spaced side portions of the frame;

a second plastic connector that is injection molded in situ over the second link end to provide a movable joint therewith, and the second plastic connector being mounted within the downwardly opening end of an associated one of the pair of tubes of the lower portion of the headrest support assembly, whereby the connector link is movable with respect to both the first and second plastic connectors and cooperates therewith to support the headrest support assembly on the frame; and a resilient bias that extends between the attachment locations of the intermediate portions of the connector links and the frame to bias the headrest support assembly downwardly and rearwardly.

\* \* \* \* \*